(12) United States Patent
Moliton

(10) Patent No.: US 7,791,804 B2
(45) Date of Patent: Sep. 7, 2010

(54) OPHTHALMIC DISPLAY COMPRISING AN OPHTHALMIC LENS AND AN OPTICAL IMAGER

(75) Inventor: Renaud Moliton, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 3 days.

(21) Appl. No.: 11/787,067

(22) PCT Filed: Oct. 7, 2005

(86) PCT No.: PCT/FR2005/050829

§ 371 (c)(1),
(2), (4) Date: Sep. 12, 2008

(87) PCT Pub. No.: WO2006/048564

PCT Pub. Date: May 11, 2006

(65) Prior Publication Data

US 2009/0009713 A1    Jan. 8, 2009

(30) Foreign Application Priority Data

Nov. 5, 2004  (FR) ................................. 04 52541

(51) Int. Cl.
*G02B 27/10* (2006.01)
(52) U.S. Cl. ........................................ 359/618; 359/630
(58) Field of Classification Search ................. 359/618, 359/630
See application file for complete search history.

(56) References Cited

U.S. PATENT DOCUMENTS

| | | | |
|---|---|---|---|
| 5,519,459 A | 5/1996 | Moglianese | 351/49 |
| 5,598,231 A | 1/1997 | Lin | 351/49 |
| 5,886,822 A | 3/1999 | Spitzer | 359/630 |
| 6,091,546 A | 7/2000 | Spitzer | 359/618 |
| 6,356,392 B1 * | 3/2002 | Spitzer | 359/630 |
| 6,384,982 B1 | 5/2002 | Spitzer | 359/630 |
| 2003/0057577 A1 | 3/2003 | Primel et al. | 264/1.7 |
| 2005/0219152 A1 | 10/2005 | Budd et al. | 345/8 |

OTHER PUBLICATIONS

International Search Report- Jan. 30, 2006.

* cited by examiner

*Primary Examiner*—Jordan M. Schwartz
*Assistant Examiner*—James C Jones
(74) *Attorney, Agent, or Firm*—Sofer & Haroun, LLP

(57) ABSTRACT

The invention relates to an ophthalmic display comprising an ophthalmic lens containing an optical imager insert (400) presenting a direction of polarization and serving to shape light beams and direct them towards the eye of the wearer to enable information content (I) to be viewed, the display also comprising at least one polarizer element for placing on a face of the lens. According to the invention, said polarizer element is constituted by an element (2A, 2B) having adjustable polarization.

5 Claims, 2 Drawing Sheets

OPHTHALMIC DISPLAY COMPRISING AN OPHTHALMIC LENS AND AN OPTICAL IMAGER

RELATED APPLICATIONS

This application is a National Phase Application of PCT/FR2005/050829, filed on Oct. 7, 2005, which in turn claims the benefit of priority from French Patent Application No. 04 52541, filed on Nov. 5, 2004, the entirety of which is incorporated herein by reference.

FIELD OF THE INVENTION

The present invention relates to an ophthalmic display comprising an ophthalmic lens and an optical imager enabling information of the image or the multimedia type to be projected.

BACKGROUND

The term "lens" relates in particular to an optionally-correcting lens suitable for mounting in the frame of a pair of eyeglasses. Such an ophthalmic lens can present conventional eyesight correction, antireflection, anti-dirtying, anti-scratching functions, for example.

U.S. Pat. No. 5,886,822 discloses an ophthalmic lens presenting a projection insert. Such a projection insert is constituted by an optical imager for shaping light beams coming from an electronic and optical system that generates light beams from an electronic signal of the miniature screen, laser diode, or light-emitting diode (LED) type. The optical imager directs the light beams towards the eye of the wearer to enable the information content thereof to be viewed.

FIG. 1 is a plan view of such a known ophthalmic display.

In the lens 300 there is embedded an imager 400 constituted by a prism 401A, a backing prism 401B, a quarterwave plate 404, and a Mangin mirror 403. The combiner includes polarization separation treatment 402 that can be implemented in the form of a deposit of thin layers.

An electronic signal conveying information is delivered to a miniature screen by a cable that is not shown. The miniature screen 320 is illuminated by a back-lighting projector, and responds to this signal by generating a pixallized image corresponding to the information.

A light beam coming from the miniature screen and following a path that is represented by a dashed line is transmitted via a lens 360 and a mirror 325 within the ophthalmic lens inside which it passes to reach the polarization separator treatment 402. The polarization of the light beam emitted by the screen is oriented in such a manner as to lie in the plane of incidence of light rays on the polarization separator treatment 402. It is said to be oriented in the P direction. The light beam then propagates through the backing prism 401B, then through the quarterwave plate 404, and then to the Mangin mirror 403 where it is reflected to pass back through the quarterwave plate in the opposite direction. The role of the Mangin mirror is to produce an enlarged image I of the screen and to position it in such a manner that is at a comfortable viewing distance for the user. Commonly, this viewing distance is adjusted so that the image appears to the user as though it were situated 1 meter (m) ahead. Furthermore, the apparent size of the image may be about 12° along a diagonal, depending on the characteristics of the imager.

The quarterwave plate 104 has its axes oriented at 45° to the polarization of the light beam. Thus, on the first passage of the light beam, it comes out in a circular polarization state. Finally, at the end of the second passage, the light beam is in a linear polarization state, but oriented at 90° to its initial polarization. In this way, when the light beam reflected by the Mangin mirror 403 has passed a second time through the quarterwave plate 404, it encounters the polarization separator treatment 402 where it then possesses a polarization direction that is perpendicular to the plane of incidence, commonly written S. It is thus reflected with high photometric efficiency to the eye of the wearer who thus sees the enlarged image I of the miniature screen 320 via the Mangin mirror 403.

Such a display presents the following problems.

The insert 400 substantially occupies a cube of area equal to the frontal area of the insert, in which area the view of the environment is disturbed. Outside the cube, the wearer of the eyeglasses can see the surroundings through the lens 300.

It is found that the information image I displayed by the system suffers from a loss of contrast due to the superposition of light coming from the outside environment. This phenomenon is particularly noticeable when the information eyeglasses are used outdoors.

Contrast is defined as follows:

$$C=(I_{on}-I_{off})/(I_{on}+I_{off})$$

where $I_{on}$ is the intensity received by the eye when looking at an information image placed in front of the surroundings, and $I_{off}$ is the image received by the eye when looking at the surroundings without an information image.

Furthermore, the polarization separator cube contained in the lens is visible from the outside which produces an unattractive appearance effect. This is due to the polarization separator multilayer treatment that allows only 50% overall of the non-polarized ambient light to pass through.

OBJECTS AND SUMMARY

The object of the invention is to propose an ophthalmic display enabling those problems to be solved, by enabling proper contrast to be conserved in the image and by hiding the cube so as to make it as little visible as possible.

To do this, the invention provides an ophthalmic display comprising an ophthalmic lens containing an optical imager insert presenting a direction of polarization and serving to shape light beams and direct them towards the eye of the wearer to enable information content to be viewed, the display also comprising at least one polarizer element for placing on a face of the lens, the display being characterized in that said polarizer element is constituted by an element having adjustable polarization.

In an embodiment, said polarizer element presents polarization perpendicular to that of the insert.

Furthermore, in another embodiment, said polarizer element presents polarization parallel to that of the insert.

Preferably, said polarizer element comprises an active film based on chiral molecules presenting polarization rotation of adjustable magnitude.

And advantageously, said active film is pixellized, each pixel being subjected individually to an electrical signal.

BRIEF DESCRIPTION OF THE DRAWINGS

The invention is described below in greater detail with the help of figures that merely show a preferred embodiment of the invention.

DETAILED DESCRIPTION

Figure 1:
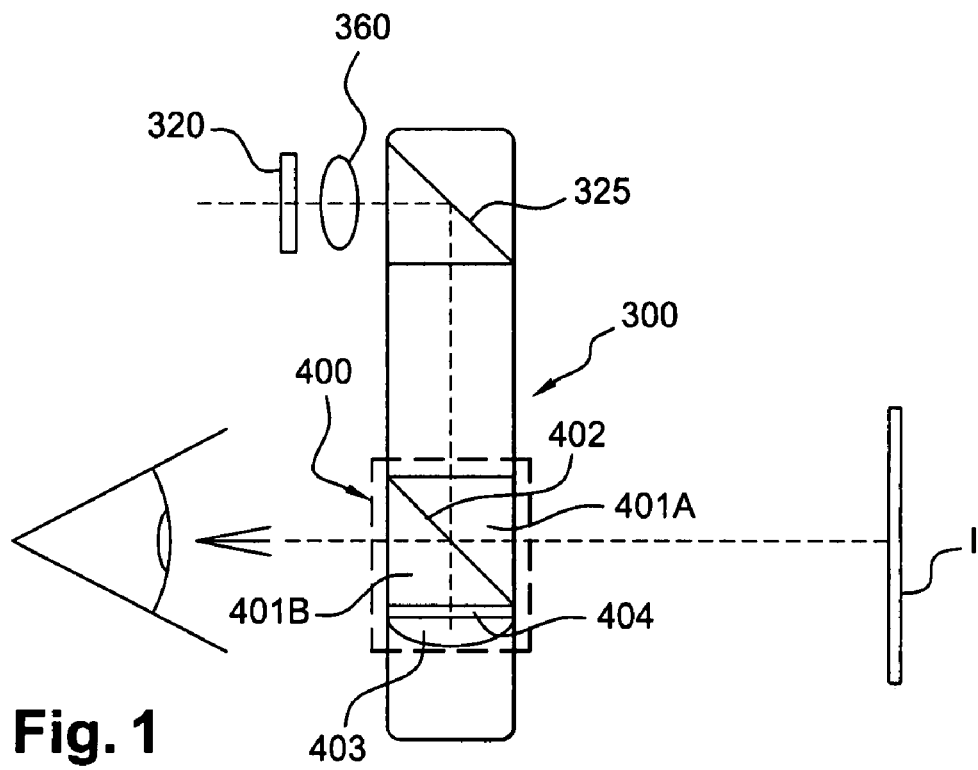
FIG. 1 is a prior art showing of an ophthalmic display.
Figure 2:
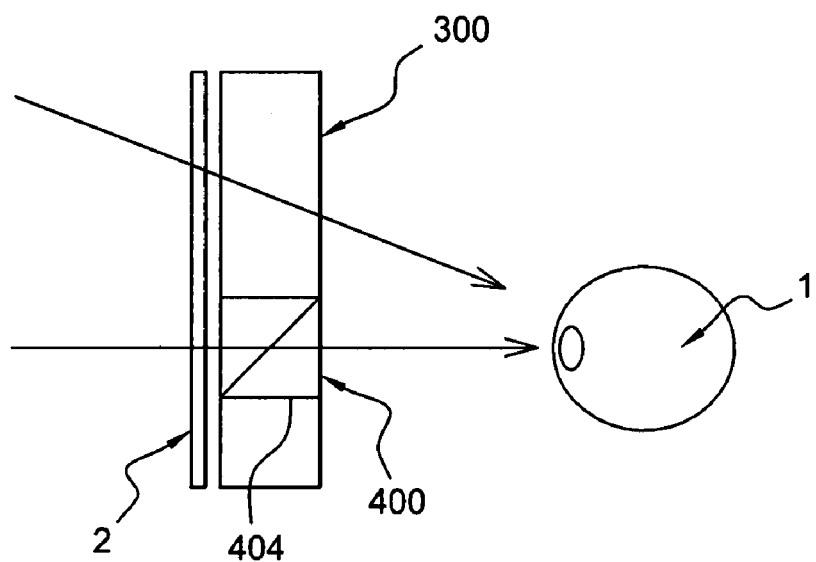
FIG. 2 is a diagrammatic view of the invention.

FIG. 2 shows the lens 300 containing an optical imager insert 400. By way of example, the optical imager can be of the same type as that described in above-mentioned U.S. Pat. No. 5,886,822.

The ophthalmic display in accordance with the invention comprises said ophthalmic lens 300 containing an optical imager insert 400 presenting a polarization direction P for the purpose of shaping light beams and directing them towards the eye 1 of the user so as to enable information content to be viewed. The display also comprises a polarizer element 2 for placing on one of the faces of the lens 300, preferably its front face.

Such a polarization separator cube 400 presents high transmission for P polarization, substantially equal to 90% or more, and low transmission for S polarization, and it presents high reflection for the S polarization, substantially equal to 90% or more, and low reflection for P polarization.

The imager insert 400 is then said to have P polarization, and in this embodiment, the polarizer 2 presents polarization parallel to that of the insert 400.

In this configuration, the alignment of the polarization direction of the polarizer 2 with the polarization direction P of the separator cube 400 has the effect of making transmission more uniform over the entire lens. The visibility of the multilayer treatment 404 to an outside observer is thus greatly diminished.

By way of example, assume that the lens 300 without a polarizer is placed on a white sheet. Transmission of the surroundings through the remainder of the lens is then substantially equal to 100%, while transmission of the surroundings through the cube 400 is substantially equal to 50%, in non-polarized light. The separator cube 400 then appears with contrast equal to 0.33, and is therefore clearly visible.

Now assume that the front face of the lens 300 has the polarizer 2 oriented in a polarization direction that is parallel to that of the insert 400. Transmission of the surroundings through the remainder of the lens is substantially equal to 50% and transmission of the surroundings through the cube 400 is substantially equal to 45%. The separator cube 400 then appears with contrast of about 0.05: that represents an object that is hardly visible.

The polarizer element may be constituted by a removable plate that can be secured to the frame of the eyeglasses by means of a clip suitable for being secured to the frame by hooks or by magnetic portions.

The polarizer element may be constituted by a film suitable for being adhesively bonded to the lens in permanent or temporary manner.

The polarizer element may be constituted by layers deposited as films on the lens. For example, this type of polarizer may be constituted by a film, brushed molecules, or a wire polarizer of the kind known to the person skilled in the art.

In a particular embodiment, the polarizer element is constituted by an element with adjustable polarization. Under such circumstances, it can be constituted by an active film based on chiral molecules presenting polarization rotation that is adjustable in magnitude.

Generally, in an adjustable polarization element of that type, a liquid crystal layer is associated with a conventional polarizer. By applying a control voltage, it is possible to vary the orientation of the polarizer as a whole. The polarization orientation control is set by the user using a control unit. Advantageously, the control unit is integrated in a single housing that provides overall control for the ophthalmic display.

This embodiment presents the advantage of enabling the orientation of the polarizer to be adjusted in order to obtain the desired effect.

By setting the polarization direction of the polarizer system parallel to that of the insert 400, the insert 400 as seen from the outside becomes camouflaged, as described above.

By adjusting the polarization direction of the polarizer system to be perpendicular to that of the insert 400, the brightness of the image of the environment is reduced.

In terms of orders of magnitude, for various lighting conditions, the contrast of the image I displayed by an information-display lens 300 with luminance of about 120 candelas per square meter ($cd/m^2$) is evaluated as shown in the table below, when not using a polarizer in accordance with the invention.

|  | Contrast of the information image |
| --- | --- |
| Intense light (painful) | <0.01 (0.006) |
| Sunlight | <0.05 (0.041) |
| Cloud cover | ≈0.06 (0.066) |
| Precision work (CIE recommended) | ≈0.4 (0.383) |
| Office (CIE recommended) | ≈0.6 (0.611) |
| Town at night | ≈0.8 (0.835) |

With a polarizer 2 of direction crossed relative to that of the separator cube 400, transmission through the cube drops considerably. The greater the effectiveness of the polarizer 2 and the better the separator treatment 402, the better is the improvement in contrast. Ideally, for a polarizer 2 and treatment 402 that are perfect, the contrast that is obtained is equal to 1.

In the configuration where it is desired to improve the contrast of the information image compared with the brightness of the surroundings, the direction of the polarizer crosses that of the P polarization of the cube 400. Under such circumstances, the transmission of the environment through the remainder of the lens is about 50%, and the transmission of the environment through the cube 400 is close to 0.

Estimating that the cube presents efficiency substantially equal to 90% and that the polarizer presents efficiency substantially equal to 99%, then the following contrast values are obtained by means of the invention.

|  | Contrast of the information image |
| --- | --- |
| Intense light (painful) | ≈0.06 |
| Sunlight | ≈0.3 |
| Cloud cover | ≈0.4 |
| Precision work (CIE recommended) | ≈0.8 |
| Office (CIE recommended) | ≈0.9 |
| Town at night | ≈0.95 |

Compared with the preceding table, it can be seen that contrast is improved very significantly, making the equipment easy to use even under outdoor conditions of the "cloudy cover" type, and possibly even under conditions of "sunlight".

When the polarizer element is not constituted by an element providing adjustable polarization, it is advantageous for the ophthalmic display also to include a second polarizer element presenting polarization that is perpendicular to that of the insert 400 and that is for placing on one of the faces of the lens 300.

When the device is in use solely as a lens for correcting eyesight, the user makes use of the first polarizer 2 that serves to camouflage the imager insert 400.

When the device is used as a lens for viewing an information image I by means of the imager insert 400, the user makes use, where necessary, of the second polarizer that optimizes contrast of the image, even when the brightness of the surroundings is considerable.

Figure 3:
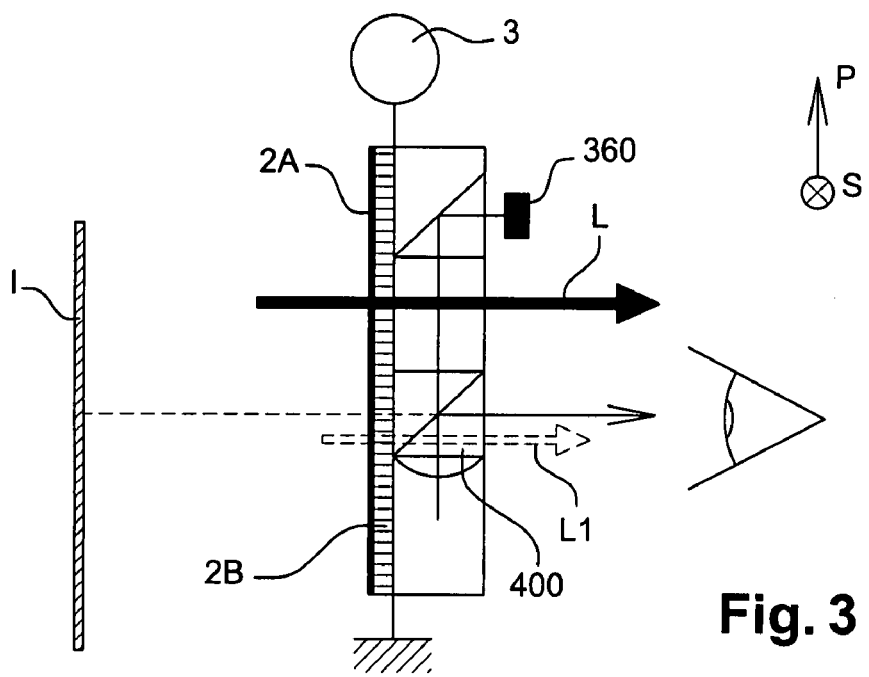
FIG. 3 is a cross-section view of a display in accordance with the invention, in a particular embodiment.

In a particular embodiment shown in FIG. 3, the polarizer element is constituted by an element having adjustable polarization.

In one type of element having adjustable polarization, a liquid crystal layer 2B is associated with a conventional polarizer 2A. By means of a control voltage 3, it is possible to vary the orientation of the overall polarizer. Control of polarization orientation is set by the user using a control unit.

In the rest state, no voltage is applied to the liquid crystal film 2B. Thus, the liquid crystals do not transform the polarization of light L from the surroundings passing through the lens.

If the polarizer element has S orientation, then the light L1 from the surroundings passing through the polarization separator cube takes on that polarization and becomes blocked by the polarization separator treatment. The cube 400 appears opaque and then the contrast of the information image I is improved over the image of the surrounding background.

Conversely, if the polarizer element has P orientation, then the light L1 from the surroundings passes right through the separator cube 400 with transmission that is substantially equivalent to that of the light L passing through the other portions of the lens. The insert is thus made poorly visible for an external observer.

In the active state, a voltage V is applied to the liquid crystal film 2B. This voltage V is calculated by the means of the art so that the liquid crystals cause the polarization of the light to turn through 90°. Thus, if the polarizer 2A is oriented with P polarization, then at the outlet from the liquid crystal layer 2B, the polarization will be S; and if the polarizer 2A is oriented with S polarization, then at the outlet from the liquid crystal layer it will have become P. This provides behavior that is the opposite of the behavior obtained in the rest state.

Alternatively, it is possible to enable the voltage V to vary, optionally continuously, over the range 0 volts (V) to U V so as to modulate the rotation imparted to the polarization by the liquid crystal. This makes it possible to obtain transient behavior so as to obtain a compromise between reduced visibility of the insert and better contrast relative to the surroundings, as selected by the user.

Figure 4:
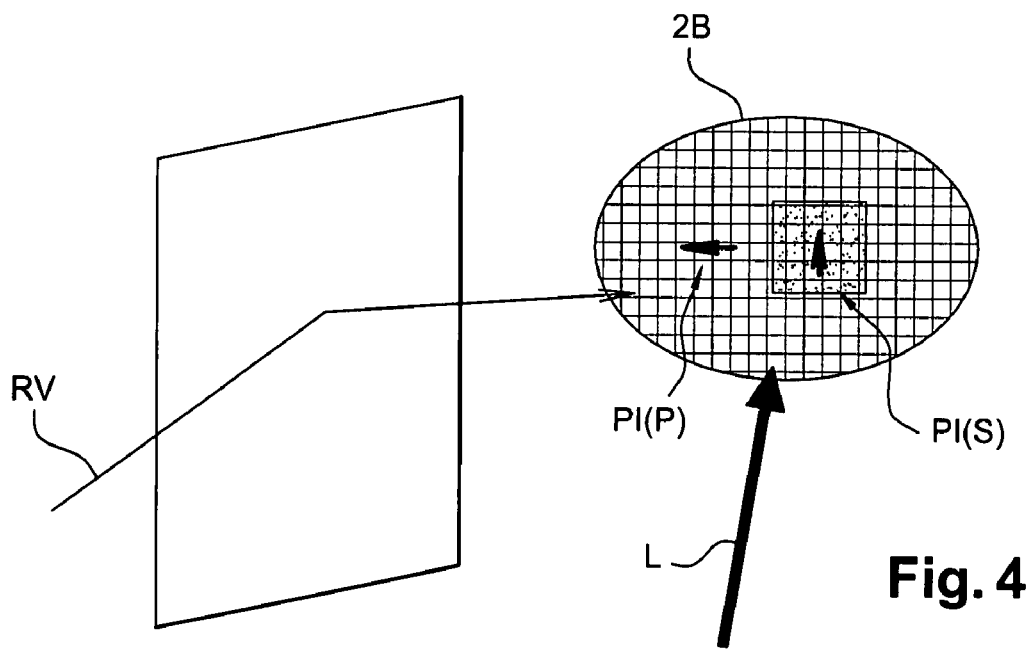
FIG. 4 shows a display in accordance with the invention, constituting another particular embodiment.

As shown in FIG. 4, it is possible to pixellize the liquid crystal films 2B so as to be able to modulate the polarization direction locally. Each pixel is addressed individually with an electric signal serving to turn the polarization through a known angle. These techniques are known in the field of liquid crystal display (LCD) screens. This makes it possible to modulate in space the transmission of the polarization in a controllable manner. This can be useful for viewing surroundings that present a high degree of polarization (water surfaces, blue sky opposite from the sun, reflection off glass, etc. . . . ) under conditions that can be selected by the user, while maintaining either an insert-camouflaging function, or an improved-contrast function.

By way of example, FIG. 4 shows a side reflection from glass, referenced RV, coming from the surroundings. The liquid crystal film 2B has pixels PI(S) with polarization S and pixels PI(P) with polarization P. The first pixels PI(S) serve to improve contrast relative to the environment. The second pixels PI(P) serve to block the reflection RV coming from the side. The remaining light from the environment is represented by arrow L.

The invention claimed is:

1. An ophthalmic display comprising:
an ophthalmic lens containing an optical imager insert presenting a direction of polarization and serving to shape light beams delivered by a miniature screen and direct them towards the eye of the wearer to enable virtual information content to be viewed, the display also having at least one polarizer element for placing on a face of the lens, wherein said polarizer element is constituted by an element having adjustable polarization, in order to enable proper contrast to be conserved in the virtual image, when the display is used for view of said virtual information content, and to hide said imager insert, when the display is used for correction of the eyesight of the wearer.

2. A display according to claim 1, wherein said polarizer element presents polarization perpendicular to that of the insert.

3. A display according to claim 1, wherein said polarizer element presents polarization parallel to that of the insert.

4. A display according to claim 1, wherein said polarizer element further comprises an active film based on chiral molecules presenting polarization rotation of adjustable magnitude.

5. A display according to claim 4, wherein said active film is pixellized, each pixel being subjected individually to an electrical signal.

* * * * *